United States Patent
Narita et al.

(10) Patent No.: US 11,932,235 B2
(45) Date of Patent: Mar. 19, 2024

(54) METHOD AND DEVICE FOR CONTROLLING HYBRID VEHICLE

(71) Applicant: Nissan Motor Co., Ltd., Yokohama (JP)

(72) Inventors: Sadaharu Narita, Kanagawa (JP); Yuki Kawai, Kanagawa (JP); Shunsuke Baba, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 318 days.

(21) Appl. No.: 17/626,520

(22) PCT Filed: Aug. 19, 2020

(86) PCT No.: PCT/JP2020/031300
§ 371 (c)(1),
(2) Date: Jan. 12, 2022

(87) PCT Pub. No.: WO2022/038718
PCT Pub. Date: Feb. 24, 2022

(65) Prior Publication Data
US 2022/0371577 A1 Nov. 24, 2022

(51) Int. Cl.
*B60W 20/50* (2016.01)
*B60R 16/02* (2006.01)
*B60W 10/08* (2006.01)

(52) U.S. Cl.
CPC ......... *B60W 20/50* (2013.01); *B60R 16/0207* (2013.01); *B60W 10/08* (2013.01); *B60W 2510/087* (2013.01); *B60W 2710/086* (2013.01)

(58) Field of Classification Search
CPC ....... B60W 20/50; B60W 10/30; B60R 16/02; B60K 6/52; B60L 50/16
See application file for complete search history.

(56) References Cited

U.S. PATENT DOCUMENTS

| | | | |
|---|---|---|---|
| 10,286,899 B2 * | 5/2019 | Barkdull | B60L 58/13 |
| 2007/0012492 A1 * | 1/2007 | Deng | B60L 50/13 180/65.1 |
| 2018/0056790 A1 * | 3/2018 | Symanow | B60L 7/16 |

FOREIGN PATENT DOCUMENTS

| | | |
|---|---|---|
| JP | 2008-220092 A | 9/2008 |
| JP | 2009-130944 A | 6/2009 |
| JP | 2012-244789 A | 12/2012 |
| JP | 2015-233366 A | 12/2015 |
| JP | 2018-154152 A | 10/2018 |

(Continued)

*Primary Examiner* — Tan Q Nguyen
(74) *Attorney, Agent, or Firm* — Global IP Counselors, LLP

(57) ABSTRACT

A hybrid vehicle control method controls a hybrid vehicle having an electric power source, a vehicle electrical equipment and drive motor to which electric power is supplied from the electric power source. The vehicle electrical equipment and the drive motor are electrically connected to the electric power source via at least a shared harness. When a temperature of the harness is equal to or greater than a predetermined temperature, upper limit values of electric power supplied from the electric power source to the vehicle electrical equipment and the drive motor are both reduced, and a degree of reduction in the upper limit value for the vehicle equipment is greater than a degree of reduction in the upper limit value for the drive motor.

4 Claims, 5 Drawing Sheets

(56) References Cited

FOREIGN PATENT DOCUMENTS

| | | |
|---|---|---|
| JP | 2019-165577 A | 9/2019 |
| WO | 2019/116586 A1 | 6/2019 |

* cited by examiner

METHOD AND DEVICE FOR CONTROLLING HYBRID VEHICLE

CROSS-REFERENCE TO RELATED APPLICATIONS

This application is a U.S. national stage application of International Application No. PCT/JP2020/031300, filed on Aug. 19, 2020.

BACKGROUND

Technical Field

The present invention relates to a method and device for controlling a hybrid vehicle.

Background Information

In a hybrid vehicle, etc., provided with a configuration in which electric power is supplied from an electric power source to a drive motor, a battery, or another electrical equipment via a wire harness (an electric wire, referred to below as a harness), there is a risk that a temperature of the harness will increase and exceed a heatproof temperature of the harness when the electric power supplied to the drive motor or electrical equipment is high. It is possible to thicken the harness to raise the heatproof temperature, but the harness increases in weight, which is undesirable in terms of vehicle weight reduction, etc. There is also the problem of incurring costs.

JP 2009-130944 A discloses a vehicle in which electric power is supplied from a power source to a load using a harness (electric wire). In this vehicle, when a temperature of the harness exceeds an upper limit temperature, the harness is protected by stopping the supply of electric power from the power source to the load.

SUMMARY

In the technology described in JP 2009-130944 A, because the electric power supply to the load is stopped when the temperature of the harness exceeds the upper limit temperature, there are cases in which, for example, adequate electric power can no longer be supplied to, inter alia, a rear wheel drive motor connected to the electric power source via the harness. In such cases, an adequate driving force cannot be obtained in response to the required torque, and there is a risk that the driver, etc., will experience discomfort or dissatisfaction.

The present invention was contrived in view of these problems, it being an object of the invention to provide a method and device for controlling a hybrid vehicle in which any discomfort or discontent experienced by the driver, etc., can be minimized while any temperature increase in the harness is minimized.

According to one aspect of the present invention, there is provided a method for controlling a hybrid vehicle comprising an electric power source, and a vehicle electrical equipment and drive motor to which electric power is supplied from the electric power source. The vehicle electrical equipment and the drive motor are electrically connected to the electric power source via at least a shared harness. When a temperature of the harness is equal to or greater than a predetermined temperature, upper limit values of electric power supplied from the electric power source to the vehicle electrical equipment and the drive motor are both reduced, and a degree of reduction in the upper limit value for the vehicle equipment is greater than a degree of reduction in the upper limit value for the drive motor.

BRIEF DESCRIPTION OF THE DRAWINGS

Referring now to the attached drawings which form a part of this original disclosure.

DETAILED DESCRIPTION OF EMBODIMENTS

Embodiments of the present invention are described below with reference to drawings, etc.

Figure 1:
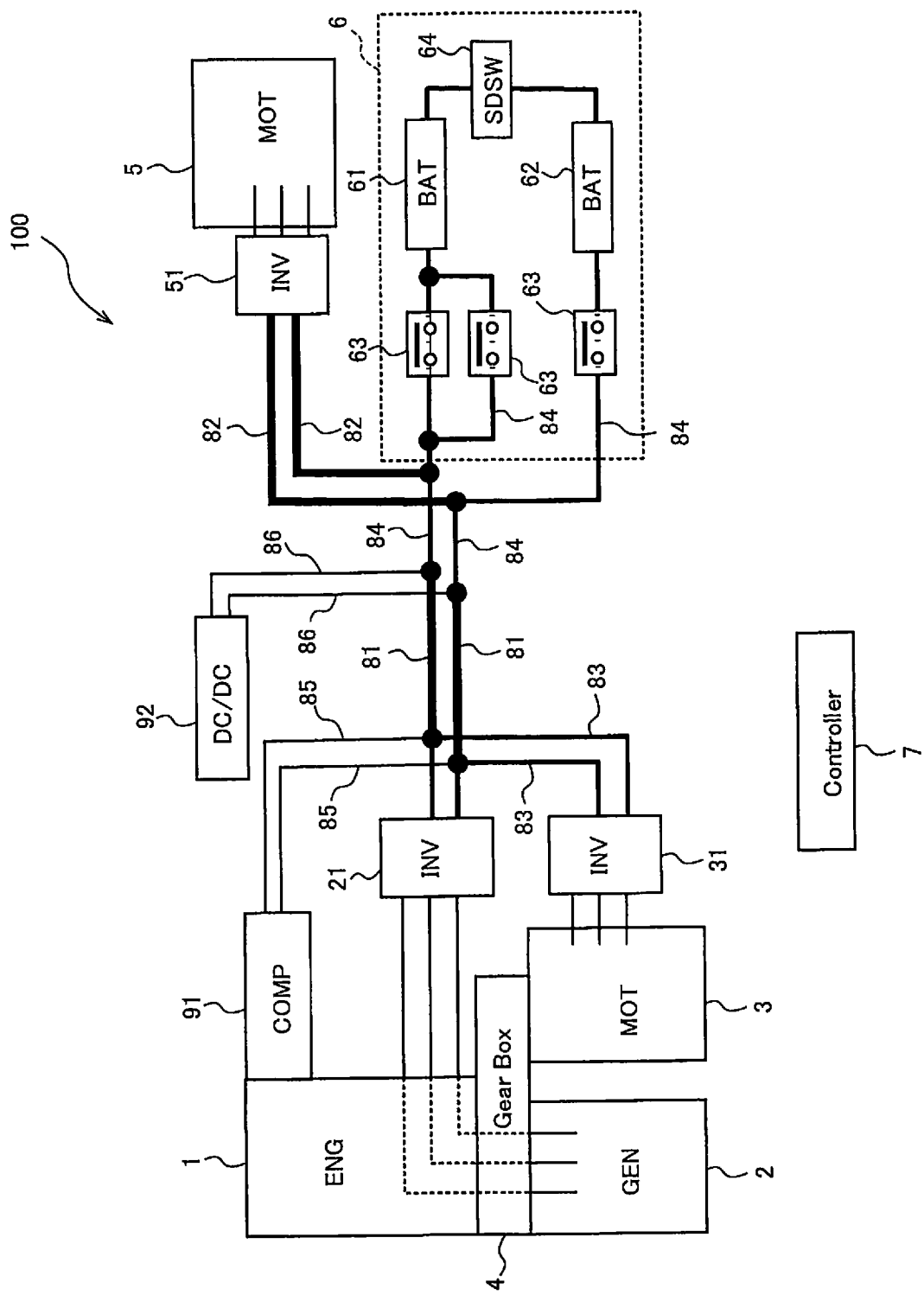
FIG. 1 is a schematic structural view of a device for controlling a hybrid vehicle according to a first embodiment of the present invention.

FIG. 1 is a schematic structural view of a device 100 for controlling a hybrid vehicle according to a first embodiment of the present invention.

The device 100 for controlling a hybrid vehicle is configured from an engine 1, an electric power generator (electric power source) 2, an electric power generator inverter 21, a front drive motor 3, a front inverter 31, a gearbox 4, a rear drive motor (drive motor) 5, a rear inverter 51, a battery device 6, a controller 7, etc. The electric power generator 2 and the rear drive motor 5 are electrically connected via a front harness (harness) 81 and a rear harness 82, and the electric power generator 2 and the battery device 6 are electrically connected via the front harness 81. The front harness 81 and the rear harness 82 are high-power electric harnesses for connecting electric components of a high-power electric system.

FIG. 1 shows a structural example in which a control device 100 is used in a "series hybrid vehicle," in which the electric power generator 2 is driven using motive power of the engine 1, electric power generated by the electric power generator 2 is supplied to the battery device 6, and the drive motors 3, 5 are caused to rotate on the basis of the electric power of the battery device 6.

The engine 1 links to an electric-power-generating motor of the electric power generator 2 via a gear train (not shown) inside the gearbox 4, and transmits motive power for the electric power generator 2 to generate electric power, to the electric-power-generating motor of the electric power generator 2.

The electric power generator 2 generates electric power due to the electric-power-generating motor (a three-phase AC motor) being rotatably driven by the motive power transmitted from the engine 1. The electric power generator 2 is electrically connected to the electric power generator inverter 21, and the electric power generator inverter 21 is electrically connected to the battery device 6. The electric power generated by the electric power generator 2 is charged in batteries 61, 62 inside the battery device 6 via the electric power generator inverter 21. The electric power charged in the batteries 61, 62 is used for the motive power of the drive motors 3, 5. In addition, the electric power generator inverter 21 is electrically connected to the front drive motor 3 and the rear drive motor 5, and to the front inverter 31 and the rear inverter 51 respectively electrically connected to the motors. Specifically, the electric power generator 2 is electrically connected to the drive motors 3, 5 via the inverters 21, 31, 51. The electric power generated by the electric power generator 2 can thereby be directly supplied to the front drive motor 3 and the rear drive motor 5 without being routed through the battery device 6. For example, the electric power generated by the electric power generator 2 is directly supplied to the drive motors 3, 5 in cases such as when there is an electric power requirement for the drive motors 3, 5 while the battery device 6 (the batteries 61, 62) is charging, or when a large amount of driving force is required as in a time of high load and the driving force requirement cannot be satisfied by electric power from the battery device 6 alone.

The electric power generator inverter 21 is electrically connected to the electric power generator 2, the battery device 6, the front inverter 31, and the rear inverter 51, and the electric power generator inverter 21 converts AC electric power generated by the electric power generator 2 to DC electric power. The electric power of the electric power generator 2 converted to DC by the electric power generator inverter 21 is supplied to the battery device 6. When the electric power generated by the electric power generator 2 is directly supplied to the drive motors 3, 5, the electric power of the electric power generator 2 converted to DC by the electric power generator inverter 21 is supplied to the front inverter 31 and the rear inverter 51 and is converted to AC in the inverters 31, 51. The electric power converted to AC is supplied to the front drive motor 3 and the rear drive motor 5. Thus, the electric power generator 2 and the electric power generator inverter 21 function as electric power sources that supply charging electric power for the battery device 6 and driving electric power for the drive motors 3, 5.

The front drive motor 3 (a three-phase AC motor) electrically connects to the battery device 6 via the front inverter 31, and links to front wheels of the vehicles via a gear train (not shown) separate from the gear train linking the engine 1 and the electric power generator 2 inside the gearbox 4. Electric power is supplied to the front drive motor 3 from the battery device 6, the front drive motor 3 rotates due to the electric power supplied from the battery device 6, and driving force is generated. The driving force generated by this rotation is transmitted to the front wheels via the gear train, and the front wheels are driven.

The front drive motor 3 electrically connects also to the electric power generator 2 via the electric power generator inverter 21 and the electric power generator inverter 21. When necessary, the electric power generated by the electric power generator 2 is directly supplied to the front drive motor 3 and the front wheels are driven. When the vehicle is decelerating, driving force of the front drive motor 3 is regeneratively generated as electric energy, and the regenerative electric power is charged in the battery device 6 (batteries 61, 62) via the front inverter 31.

The front inverter 31 electrically connects to the front drive motor 3, the battery device 6, and the electric power generator inverter 21. The front inverter 31 is a driving inverter that converts DC electric power from the battery device 6, or electric power generated by the electric power generator 2 and converted to DC by the electric power generator inverter 21, to AC and supplies the AC power to the front drive motor 3. The front inverter 31 also converts AC electric power regeneratively generated by the front drive motor 3 to DC electric power and supplies the DC power to the battery device 6.

The gearbox 4 is a gear device that includes gear trains composed of a plurality of gears. Accommodated in the gearbox 4 are a gear train linking the engine 1 and the electric power generator 2, and a gear train linking the front drive motor 3 and the front wheels. Thus, two gear trains are accommodated within one gearbox 4, whereby oil can be efficiently supplied to the gear trains and oil can be conserved. The two gear trains are preferably accommodated within one gearbox 4, but this example is not provided by way of limitation. Specifically, the configuration may be such that the gear train linking the engine 1 and the electric power generator 2 and the gear train linking the front drive motor 3 and the front wheels are accommodated in separate gearboxes.

The rear drive motor 5 (a three-phase AC motor) electrically connects to the battery device 6 via the rear inverter 51, and links to rear wheels of the vehicle via a gear train (not shown). When electric power is supplied to the rear drive motor 5 from the battery device 6, the rear drive motor 5 rotates, driving force generated by this rotation is transmitted to the rear wheels, and the rear wheels are driven.

The rear drive motor 5 electrically connects also to the electric power generator 2 via the rear inverter 51 and the electric power generator inverter 21, and when necessary, electric power generated by the electric power generator 2 is directly supplied to the rear drive motor 5 and the rear wheels are driven. As with the front drive motor 3, when the vehicle is decelerating, driving force of the rear drive motor 5 is regeneratively generated as electric energy, and the regenerative electric power is charged in the battery device 6 (batteries 61, 62) via the rear inverter 51.

The rear inverter 51 electrically connects to the rear drive motor 5, the battery device 6, and the electric power generator inverter 21. The rear inverter 51 is a driving inverter that converts DC electric power from the battery device 6, or electric power generated by the electric power generator 2 and converted to DC by the electric power generator inverter 21, to AC and supplies the AC power to the rear drive motor 5. The rear inverter 51 also converts AC electric power regeneratively generated by the rear drive motor 5 to DC electric power and supplies the DC power to the battery device 6.

The battery device (vehicle electrical equipment) 6 is a battery pack including batteries 61, 62 of a secondary cell, relays 63, an SD switch 64, etc. The batteries 61, 62 are high-power batteries that supply stored electric power to the drive motors 3, 5, and are electrically connected to the electric power generator 2, the front drive motor 3, and the rear drive motor 5. The battery 61 and the battery 62 are electrically connected via the SD switch 64. The electric power generated by the electric power generator 2 and the regenerative electric power of the drive motors 3, 5 are charged in the batteries 61, 62, and electric power charged in the batteries 61, 62 is supplied to the front drive motor 3 and the rear drive motor 5. The front drive motor 3 and the rear drive motor 5 are rotatably driven by the electric power supplied from the batteries 61, 62, and the hybrid vehicle travels due to motive power of the drive motors 3, 5. As previously described, when there is an electric power requirement for the drive motors 3, 5 while the batteries 61, 62 are charging, the electric power generated by the electric power generator 2 is directly supplied to the drive motors 3, 5. In cases such as a time of high load in which the driving force requirement cannot be satisfied by electric power from the battery device 6 alone, the electric power of the batteries

61, 62 and the electric power generated by the electric power generator 2 are supplied to the drive motors 3, 5 and are both used.

The relays 63 are installed near the batteries 61, 62 on wiring connecting the batteries 61, 62 with the electric power generator 2, the front drive motor 3, and the rear drive motor 5. The relays 63 are capable of opening and closing so as to switch between a state of allowing electrical continuity between the batteries 61, 62 and the electric power generator 2, front drive motor 3, and rear drive motor 5 (an ON state), and a state of electrically cutting off the aforementioned components (an OFF state).

The SD switch 64 is a switch that manually or automatically sets circuits of the batteries 61, 62 to OFF in times such an emergency, and is provided on the wiring electrically connecting the battery 61 and the battery 62.

The battery device 6 is provided with an electric current sensor (not shown) that detects electric current values of the batteries 61, 62. The electric current values detected by the electric current sensor are sent to the controller 7 (described hereinafter).

The controller 7 is, for example, a vehicle control module (VCM), and the controller 7 integrally controls, inter alia, the reception of the supply of electric power for the entire hybrid vehicle, and the actions of the engine 1, the electric power generator 2, and the drive motors 3, 5.

The controller 7 is configured from a microcomputer provided with a central processing device (CPU), read-only memory (ROM), random-access memory (RAM), and an input/output interface (I/O interface). The controller 7 can also be configured from a plurality of microcomputers. By executing a specific program, the controller 7 executes a process for controlling the entire device 100 for controlling a hybrid vehicle. For example, the controller 7 executes a process for protecting the harness (described hereinafter).

The electric-power-generating motor of the electric power generator 2, the front drive motor 3, and the rear drive motor 5 are each provided with a resolver, an encoder, or another speed detection device, and the speed detection devices detect the speed of the motors. The detected motor speeds are sent to the controller 7.

Between the electric-power-generating motor of the electric power generator 2 and the electric power generator inverter 21, between the front drive motor 3 and the front inverter 31, and between the rear drive motor 5 and the rear inverter 51, respective electric current sensors (not shown) are installed. The electric current sensors detect AC electric currents of the motors, and the detected electric current values are sent to the controller 7. The electric current sensors may detect the AC electric currents of the three phases, or may detect the electric currents of any two phases and the electric current of the remaining phase may be computed and determined by the controller 7.

Voltage sensors (not shown) are attached to DC-end sides of the electric power generator inverter 21, the front inverter 31, and the rear inverter 51, and the voltage sensors detect DC-end voltages of the inverters. The detected voltage values are sent to the controller 7.

Details of the wiring of the device 100 for controlling a hybrid vehicle shall next be described.

The electric power generator inverter 21 and the front inverter 31 are electrically connected by busbars 83, as shown in FIG. 1. Electric power generated by the electric power generator 2 can thereby be supplied to the front drive motor 3 via the busbars 83.

The electric power generator inverter 21, the front inverter 31, and the batteries 61, 62 are electrically connected by the busbars 83, busbars 84, and two front harnesses 81 linking the busbars 83 and the busbars 84. Relays 63 are provided in proximity to the batteries 61, 62 on the busbars 84. Furthermore, the electric power generator inverter 21 and the rear inverter 51 are electrically connected by the busbars 83, the busbars 84, the two front harnesses 81 linking the busbars 83 and the busbars 84, and two rear harnesses 82 connected to the busbars 84. Specifically, the batteries 61, 62 and the rear drive motor 5 are connected to the electric power generator 2, which is an electric power source, via the same front harnesses 81. Due to this configuration, the electric power generated by the electric power generator 2 and the electric power regenerated by the front drive motor 3 are charged in the batteries 61, 62 via the front harnesses 81, and the electric power regenerated by the rear drive motor 5 is charged in the batteries 61, 62 via the rear harnesses 82. The electric power charged in the batteries 61, 62 is supplied to the front drive motor 3 via the front harnesses 81 and supplied to the rear drive motor 5 via the rear harnesses 82. In addition, when electric power is supplied from the electric power generator 2 to the rear drive motor 5, the electric power generated by the electric power generator 2 is supplied to the rear drive motor 5 via the front harnesses 81 and the rear harnesses 82.

An air compressor 91 or another vehicle electrical equipment (auxiliary equipment) may be connected to the busbars 83 via harnesses 85, as shown in FIG. 1. In addition, a DC/DC converter 92 or another vehicle electrical equipment (auxiliary equipment) may be connected to the busbars 84 via harnesses 86. Electric power generated by the electric power generator 2 may be supplied to the air compressor 91, the DC/DC converter 92, or other vehicle electrical equipment via the electric power generator inverter 21.

Thus, in the device 100 for controlling a hybrid vehicle, the batteries 61, 62, the rear drive motor 5, and the electric power generator 2, which is an electric power source, are connected using high-power electric harnesses (the front harnesses 81 and the rear harnesses 82). However, the harness coating (cross-linked polyethylene, silicone rubber, etc.) has a heatproof temperature restriction; when a large amount of electric power is passing through the harnesses, the temperature of the harnesses rises and there is a risk that the heatproof temperature of the harness coatings (referred to below as the heatproof temperature of the harnesses) will be exceeded. In the device 100 for controlling a hybrid vehicle, the batteries 61, 62 and the rear drive motor 5 are connected to the electric power generator 2 via the same front harnesses 81. Accordingly, when charging of the batteries 61, 62 and electric power supply to the rear drive motor 5 must be done simultaneously, the electric power generated by the electric power generator 2 is supplied to the batteries 61, 62 and the rear drive motor 5 via the same front harnesses 81. Therefore, a large amount of electric power passes through the front harnesses 81, the front harnesses 81 rise in temperature, and there is a risk that the heatproof temperature will be exceeded. If busbars are used in all of the wiring, the heatproof temperature restriction is nearly eliminated, but it is difficult to use only busbars in locations where the wiring distance is long (for example, several meters) due to problems of workability and maneuverability.

When, in order to protect the harnesses to address this problem, the supply of electric power from the electric power generator 2 to the rear drive motor 5 is stopped in the event that the temperature of the front harnesses 81 exceeds the upper limit temperature, there is a risk that sufficient driving force will not be achieved for the required torque of the vehicle and the driver, etc., will experience discomfort or dissatisfaction.

It is also possible to thicken the harnesses to raise the heatproof temperature, but the weight of the harnesses would increase, which is undesirable from a standpoint of vehicle weight reduction, etc., and there would also be the problem of incurred costs. The batteries 61, 62 and the rear drive motor 5 can be connected to the electric power generator 2 using separate harnesses, but there would be problems such as more complicated wirings and a greater number of wirings, which is undesirable from a standpoint of vehicle weight reduction, etc. Scenarios in which the charging of the batteries 61, 62 and the electric power supply to the rear drive motor 5 must be done simultaneously are by nature limited to cases such as when, for example, the batteries 61, 62 have a low SOC and need charging, the accelerator is depressed by the driver, and there is an electric power requirement for the rear drive motor 5. Specifically, in cases such as when electric power is being supplied from the batteries 61, 62 to the drive motors 3, 5, or when electric power supply to the rear drive motor 5 is not needed such as when the vehicle is decelerating, the charging electric power for the batteries 61, 62 and the driving electric power for the rear drive motor 5 do not simultaneously pass through the front harnesses 81. Thus, it is undesirable to, inter alia, thicken the harnesses or increase the number of wirings for the sake of these limited scenarios.

In view of this, in the present embodiment, when the temperature of the front harnesses 81 is equal to or greater than a predetermined temperature, a upper limit value of electric power supplied to the batteries 61, 62 and the rear drive motor 5 is reduced, and a degree of reduction in this upper limit value for the batteries 61, 62 is increased above a degree of reduction in this upper limit value for the rear drive motor 5. Specifically, to minimize the temperature increase in the front harnesses 81, the restriction of the electric power supply to the batteries 61, 62 is further increased and the restriction of the electric power supply to the rear drive motor 5 is further reduced. It is thereby possible to maintain electric power supply to the rear drive motor 5 while restricting the electric power passing through the front harnesses 81. Specifically, it is possible to minimize any discomfort or dissatisfaction experienced by the driver, etc., while minimizing the temperature increase of the front harnesses 81.

There may be instances in which (1) charging electric power for the batteries 61, 62 and electric power supplied to the rear drive motor 5 simultaneously pass through the front harnesses 81, (2) only electric power supplied from the electric power generator 2 to the rear drive motor 5 passes through the front harnesses 81, and (3) only electric power supplied from the batteries 61, 62 to the front drive motor 3 passes through the front harnesses 81. In the instances of (2) and (3), the amount of electric power passing through the front harnesses 81 is not large, and the problem in which the temperature of the front harnesses 81 exceeds the heatproof temperature therefore normally does not occur.

Figure 2:
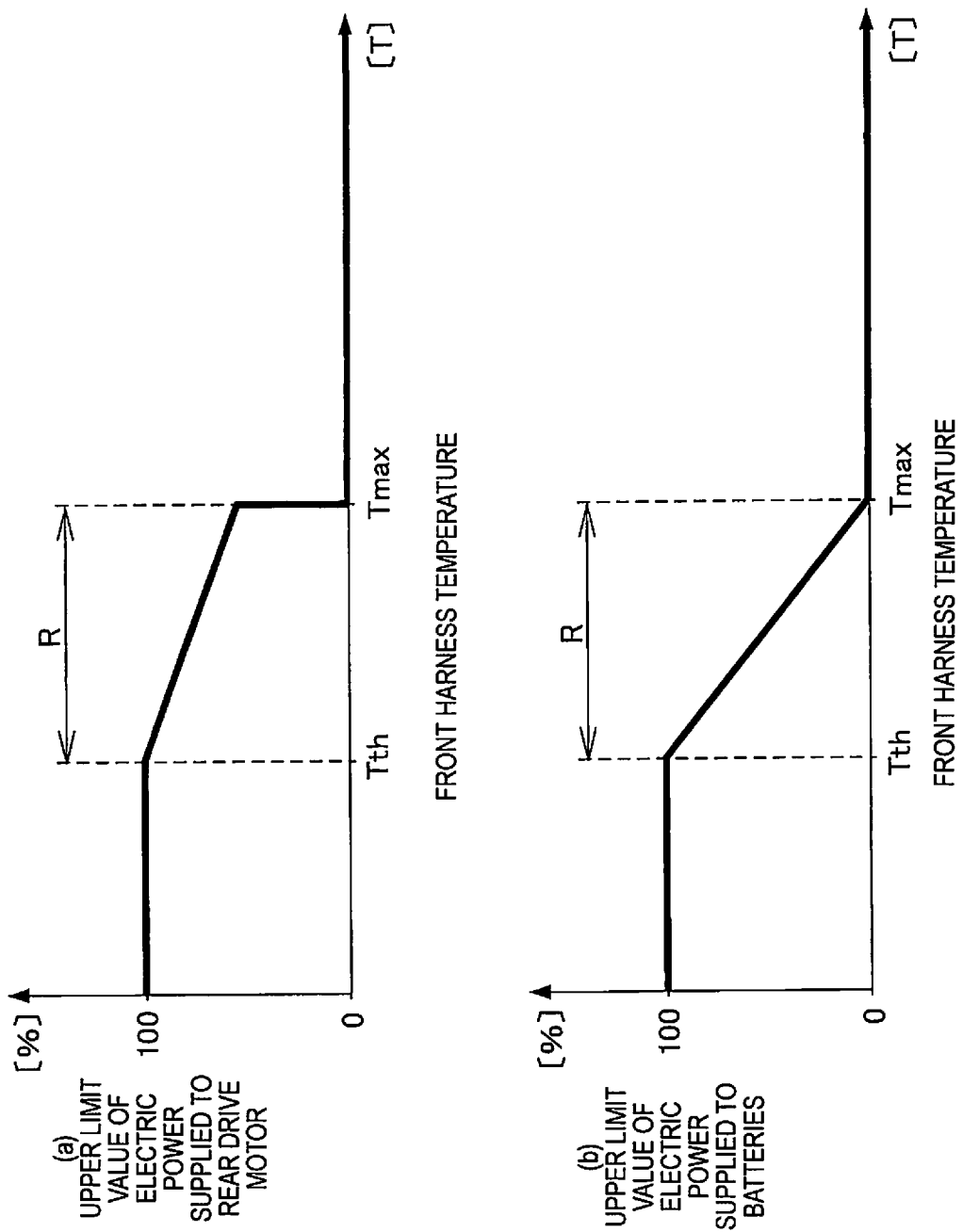
FIG. 2 shows graphs illustrating a control for harness protection according to the first embodiment.

FIG. 2 shows graphs illustrating a control for harness protection according to the present embodiment, and this graph shows the restriction of the electric power supplied from the electric power generator 2 to the rear drive motor 5 and the batteries 61, 62, corresponding to the temperature increase in the front harnesses 81. FIG. 2 is also graphs illustrating control executed in a scenario in which charging of the batteries 61, 62 and electric power supply to the rear drive motor 5 are done simultaneously.

Graph (a) in FIG. 2 shows the restriction of the upper limit value of electric power outputted to the rear drive motor 5 corresponding to the temperature increase in the front harnesses 81, and graph (b) shows the restriction of the upper limit value of electric power outputted to the battery device 6 corresponding to the temperature increase in the front harnesses 81. The curves in these graphs represent upper limit values of electric power outputted from the electric power generator 2 to the rear drive motor 5 and the batteries 61, 62, and the upper limit values of electric power outputted to rear drive motor 5 and the batteries 61, 62 are both 100% when there is no output restriction.

In cases such as when the batteries 61, 62 have a low SOC and need charging, the accelerator is depressed by the driver, and there is an electric power requirement for the rear drive motor 5, the charging of the batteries 61, 62 and the electric power supply to the rear drive motor 5 must be done simultaneously. In such scenarios, the temperature of the front harnesses 81 rises readily because charging electric power for the batteries 61, 62 and driving electric power for the rear drive motor 5 pass through the front harnesses 81 simultaneously. As shown in FIG. 2, when the temperature of the front harnesses 81 rises and comes to be equal to or greater than a predetermined temperature $T_{th}$, a restriction of the output electric power is initiated, and the upper limit value of electric power outputted from the electric power generator 2 to the rear drive motor 5 and the upper limit value of electric power outputted to the battery device 6 are reduced. The predetermined temperature $T_{th}$ mentioned here is a temperature (e.g., a value 5° C. lower than the heatproof temperature of the front harnesses 81) at which, if the temperature of the front harnesses 81 continues to rise, there is a risk that a critical value of the heatproof temperature of the front harnesses 81 will be reached within a certain period of time, although not immediately. When the temperature of the front harnesses 81 exceeds a critical temperature $T_{max}$, the relays 63 are switched to an OFF state and the electric power supply from the electric power generator 2 to the rear drive motor 5 and the battery device 6 is completely cut off. The critical temperature $T_{max}$ is set to a critical value of the heatproof temperature of the front harnesses 81 or to a temperature near the heatproof temperature of the front harnesses 81, which is slightly lower than the heatproof temperature. The temperature of the front harnesses 81 is estimated from the value of electric current flowing through the front harnesses 81. The details of estimating the temperature of the front harnesses 81 shall be described hereinafter.

The restriction of the upper limit value of electric power outputted to the rear drive motor 5 is carried out by reducing the upper limit value of required torque of the rear drive motor 5. When the temperature of the front harnesses 81 is in a range (restriction range R) from the predetermined temperature $T_{th}$ to the critical temperature $T_{max}$ (inclusive), the upper limit value of required torque of the rear drive motor 5 is reduced as the temperature of the front harnesses 81 rises. The upper limit value of electric power outputted to the rear drive motor 5 is thereby reduced as the temperature of the front harnesses 81 increases when the front harnesses 81 are in the range (restriction range R) from the predetermined temperature $T_{th}$ to the critical temperature $T_{max}$ (inclusive), as shown in FIG. 2. When the temperature of the front harnesses 81 exceeds $T_{max}$, the supply of electric power from the electric power generator 2 is cut off.

In the restriction range R, the upper limit value of charging electric power supplied to the batteries 61, 62 is also reduced simultaneously with the reduction of electric power outputted to the rear drive motor 5, as shown in FIG. 2. At this time, the degree of reduction in the upper limit value of electric power supplied to the batteries 61, 62 is greater than the degree of reduction in the upper limit value of electric power supplied to the rear drive motor 5. The degree of reduction mentioned here is, for example, a reduction rate in the upper limit value with respect to the upper limit value of the outputted electric power before the restriction of the outputted electric power is initiated, or a reduction rate in the upper limit value (i.e., the absolute value of the slope of the curve of FIG. 2) when the temperature of the front harnesses 81 has risen by a unit temperature. When the upper limit value of the outputted electric power before the restriction of the outputted electric power is initiated is designated as 100%, in the restriction range R, the upper limit value of electric power outputted to the batteries 61, 62 is always smaller (i.e., the reduction rate of the upper limit value is greater) than the upper limit value of electric power outputted to the rear drive motor 5, as shown in FIG. 2. Specifically, the degree of reduction in the upper limit value of electric power supplied to the batteries 61, 62 is greater than the degree of reduction in the upper limit value of electric power supplied to the rear drive motor 5.

By thus making the degree of reduction in the upper limit value of electric power supplied to the batteries 61, 62 greater than the degree of reduction in the upper limit value of electric power supplied to the rear drive motor 5, it is possible to keep any reduction in driving electric power supplied to the rear drive motor 5 to a minimum. For example, as shown in FIG. 2, when the temperature of the front harnesses 81 has risen to $T_{max}$, the charging electric power supplied to the batteries 61, 62 reaches zero, but the upper limit value of driving electric power supplied to the rear drive motor 5 does not reach zero, and a certain amount of electric power can be supplied to the rear drive motor 5. In this case, the upper limit value of electric power supplied to the rear drive motor 5 when the temperature of the front harnesses 81 reaches $T_{max}$ is established on the basis of the electric power at which balanced is reached, i.e., the supplied electric power at which heat generation and heat dissipation in the front harnesses 81 are balanced. However, considering error caused by air temperature, etc., electric power further reduced by such error from the electric power at which balance is reached may be set as the upper limit value of electric power supplied to the rear drive motor 5.

In cases such as when great driving force is required for the rear drive motor 5, such as in times of high load, electric power is supplied to the rear drive motor 5 from both the batteries 61, 62 and the electric power generator 2. In these cases, the electric power from the batteries 61, 62 and the electric power generator 2 is supplied to the rear drive motor 5 via the rear harnesses 82, and the electric power passing through the rear harnesses 82 is therefore greater. Therefore, there is a risk that the temperature of the rear harnesses 82 will rise and exceed the heatproof temperature. Accordingly, when the temperature of the rear harnesses 82 is from the predetermined temperature $T_{th}$ to the critical temperature $T_{max}$ (inclusive), the upper limit value of required torque of the rear drive motor 5 is reduced on the basis of the temperature of the rear harnesses 82 so that the temperature of the rear harnesses 82 will not exceed the heatproof temperature. Due to this action, the upper limit value of electric power supplied to the rear harnesses 82 is reduced, and the temperature of the rear harnesses 82 is minimized. In addition, when the temperature of the rear harnesses 82 exceeds the critical temperature $T_{max}$, the relays 63 are switched to an OFF state, the electric power supply from the batteries 61, 62 to the rear drive motor 5 is cut off, and the electric power supply from the electric power generator 2 to the rear drive motor 5 is also cut off.

When (2) only electric power supplied to the rear drive motor 5 passes through the front harnesses 81 or when (3) only electric power supplied to the front drive motor 3 passes through the front harnesses 81, normally the temperature of the front harnesses 81 will not be equal to or greater than the predetermined temperature $T_{th}$. If the temperature of the front harnesses 81 is equal to or greater than $T_{th}$ in scenario (2), the upper limit value of electric power outputted by the electric power generator 2 is reduced so that the temperature of the front harnesses 81 will not exceed the heatproof temperature. When the electric power supplied to the rear drive motor 5 is thereby reduced, proportionally reduced electric power may be supplied from the batteries 61, 62 to the rear drive motor 5. When the temperature of the front harnesses 81 is equal to or greater than $T_{th}$ in scenario (3), upper limit value of electric power outputted from the batteries 61, 62 to the front drive motor 3 is reduced so that the temperature of the front harnesses 81 will not exceed the heatproof temperature. When the electric power supplied to the rear drive motor 5 is thereby reduced, proportionally reduced electric power may be supplied from the electric power generator 2 to the front drive motor 3.

Figure 3:
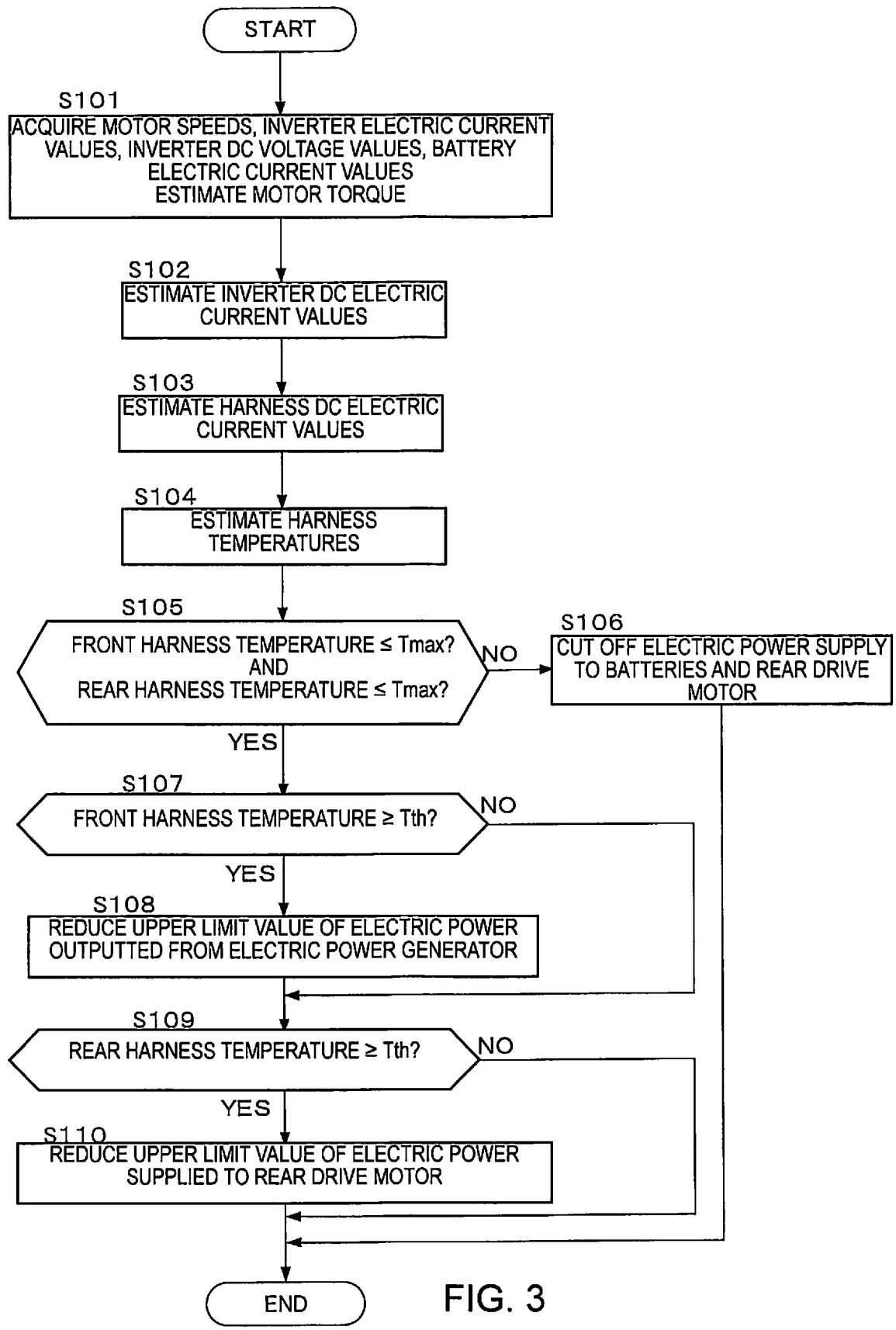
FIG. 3 is a flowchart illustrating the control for harness protection according to the first embodiment.

FIG. 3 is a flowchart illustrating the control for harness protection according to the present embodiment. The following control is executed repeatedly at predetermined time intervals by the controller (VCM) 7.

The control for harness protection is initiated by the controller 7 receiving a command to start up the device 100 for controlling a hybrid vehicle. For example, when an ON operation of switching an ignition key of the vehicle from OFF to ON is performed, a startup command is sent to the controller 7.

Steps S101-S104 are steps for estimating the temperature of the front harnesses 81. A temperature change $\Delta T$ in the temperature T of the harnesses can be determined through the following formula (1), from the difference between a heat generation amount $(r/C_p)I^2$ and a heat dissipation amount $(hA/C_p)(T-T\infty)$ in the harnesses. In formula (1), $\Delta t$ represents time elapsed from the previous temperature estimation, $r/C_p$ represents a heat generation coefficient, $hA/C_p$ represents a heat dissipation coefficient, T represents an estimated temperature at the time of the previous estimation (previous estimated temperature), and $T\infty$ represents an ambient temperature around the harnesses. The heat generation coefficient $r/C_p$ and the heat dissipation coefficient $hA/C_p$ are constants unique to the harnesses and are fixed values. In addition, the ambient temperature around the harnesses may be an actually measured value, but a fixed value appropriately determined in advance by experimentation, etc., may be used.

[Formula 1]

$$\Delta T/\Delta t = r/C_p \times I^2 - hA/C_p(T-T_\infty) \qquad (1)$$

As shown in formula (1), the temperature change $\Delta T$ of the harnesses can be estimated from the value I of electric current flowing through the harnesses. The temperature of the harnesses can also be determined by adding the previous estimated temperature T and the temperature change $\Delta T$ in the harnesses. In the present embodiment, the value I of electric current flowing through the harnesses is first estimated, and the temperature of the harnesses is estimated from the estimated value of the electric current.

In step S101, the controller 7 acquires: the speeds of the power-generating motor of the electric power generator 2, the front drive motor 3, and the rear drive motor 5; the electric current values and DC-end voltage values of the electric power generator inverter 21, the front inverter 31, and the rear inverter 51; and the electric current values of the batteries 61, 62. The controller 7 also estimates the torques of the motors from the acquired electric current values of the inverters.

In step S102, the controller 7 estimates the DC voltage values of the electric power generator inverter 21, the front inverter 31, and the rear inverter 51 on the basis of the speeds and torques of the motors and the DC-end voltage values of the inverters. The DC electric current values of the front inverter 31 and the rear inverter 51 are equivalent to the DC electric current values of the busbars 83 and the rear harnesses 82.

In step S103, the controller 7 estimates the values of DC electric current flowing through the front harnesses 81 and the rear harnesses 82 on the basis of the estimated DC electric current values of the inverters. Specifically, when charging the batteries 61, 62 and supplying electric power to the rear drive motor 5 are done simultaneously, a DC electric current value $I_{FrHAR}$ of the front harnesses 81 is estimated using formula (2) below, in which an input electric current $I_{LBCin}$ of the batteries 61, 62 and an input electric current $I_{Rrin}$ of the rear inverter 51 are added. In addition, a DC electric current value $I_{RrHAR}$ of the rear harnesses 82 is estimated using formula (3) below, in which input electric currents $I_{Frin}$, $I_{LBCin}$ of the front inverter 31 and the batteries 61, 62 are subtracted from an output electric current $I_{GENout}$ of the electric power generator inverter 21.

[Formula 2]

$$I_{FrHAR} = I_{LBCin} + I_{Rrin} \quad (2)$$

[Formula 3]

$$I_{RrHAR} = I_{GENout} - I_{Frin} - I_{LBCin} \quad (3)$$

When electric power is supplied to the front drive motor 3 and the rear drive motor 5 from only the batteries 61, 62, the DC electric current value $I_{FrHAR}$ of the front harnesses 81 is estimated using formula (4) below, in which the input electric current $I_{Rrin}$ of the rear inverter 51 is subtracted from an output electric current $I_{LBCout}$ of the batteries 61, 62. In addition, the DC electric current value $I_{RrHAR}$ of the rear harnesses 82 is estimated using formula (5) below, in which the input electric current $I_{Frin}$ of the front inverter 31 is subtracted from the output electric current $I_{LBCout}$ of the batteries 61, 62.

[Formula 4]

$$I_{FrHAR} = I_{LBCout} - I_{Rrin} \quad (4)$$

[Formula 5]

$$I_{RrHAR} = I_{LBCout} - I_{Frin} \quad (5)$$

As previously described, there are cases in which electric power is supplied from both the electric power generator 2 and the batteries 61, 62 to the front drive motor 3 and the rear drive motor 5, such as in times of high load. In these cases, the DC electric current value $I_{FrHAR}$ of one the front harnesses 81 is estimated using formula (6) below, in which the input electric current $I_{Frin}$ of the front inverter 31 is subtracted from the output electric current $I_{GENout}$ of the electric power generator inverter 21, and the same value of the other of the front harnesses 81 is estimated using formula (7) below, in which the input electric current $I_{Rrin}$ of the rear inverter 51 is subtracted from the output electric current $I_{LBCout}$ of the batteries 61, 62. In addition, the DC electric current value $I_{FrHAR}$ of the rear harnesses 82 is estimated using formula (8) below, in which the which the input electric current $I_{Frin}$ of the front inverter 31 is subtracted from the sum of the output electric current $I_{LBC\ out}$ of the batteries 61, 62 and the output electric current $I_{GENout}$ of the electric power generator 2.

[Formula 6]

$$I_{FrHAR} = I_{GENout} - I_{Frin} \quad (6)$$

[Formula 7]

$$I_{FrHAR} = I_{LBCout} - I_{Rrin} \quad (7)$$

[Formula 8]

$$I_{RrHAR} = I_{LBCout} + I_{GENout} - I_{Frin} \quad (8)$$

In step S103, when the values $I_{FrHAR}$, $I_{RrHAR}$ of DC electric current flowing through the front harnesses 81 and the rear harnesses 82 are estimated, the controller 7 executes the process of step S104.

In step S104, the controller 7 estimates the temperatures of the harnesses 81, 82 on the basis of the values $I_{FrHAR}$, $I_{RrHAR}$ of DC electric current flowing through the front harnesses 81 and the rear harnesses 82. Specifically, formula (1) previously described is used to calculate the temperature changes ΔT in the harnesses 81, 82, and the previous estimated temperatures T and the temperature changes ΔT are added to estimate the temperatures of the harnesses 81, 82.

The ambient temperature T∞ around the harnesses is used for an initial value of the previous estimated temperature T. Specifically, in a first temperature estimation, the heat dissipation amount $(hA/C_p)(T-T\infty)$ is zero. Accordingly, a value obtained by multiplying an elapsed time Δt since startup of the control device 100 by the heat generation amount $(r/C_p)I^2$ in the harnesses 81, 82 is the temperature change ΔT, and a value obtained by adding the temperature change ΔT and the ambient temperature T∞ around the harnesses (the previous estimated temperature T) is a harness estimated temperature.

Steps S105-S107 are steps in which the electric power supply is controlled on the basis of the temperature of the harnesses.

When the temperatures of the front harnesses 81 and the rear harnesses 82 are estimated, in step S105, the controller 7 assesses whether the temperatures of the harnesses 81, 82 have not exceeded the critical temperature $T_{max}$. The critical temperature $T_{max}$ is either a critical value of the heatproof temperature of the harnesses 81, 82, or is set for each of the harnesses 81, 82 and is set to a temperature that is slightly lower than the heatproof temperature of the harnesses 81, 82 and that is near the heatproof temperature.

When the temperature of the front harnesses 81 or the rear harnesses 82 exceeds $T_{max}$, in step S106, the controller 7 switches the relays 63 to the OFF state and cuts off the electric power supply from the electric power generator 2 to the batteries 61, 62 or the electric power supply from the batteries 61, 62 to the drive motors 3, 5. At the same time, the controller 7 cuts off the electric power supply from the electric power generator 2 to the rear drive motor 5. Upon cutting off these electric power supplies, the controller 7 ends the control for harness protection.

When neither of the temperatures of the front harnesses 81 and the rear harnesses 82 exceeds $T_{max}$, the controller 7 executes the process of step S107.

In step S107, the controller 7 assesses whether or not the temperature of the front harnesses 81 is equal to or greater than the predetermined temperature $T_{th}$. The predetermined temperature $T_{th}$ is a temperature at which even if the front harnesses 81 further rise in temperature, the critical value of the heatproof temperature of the front harnesses 81 is not immediately reached, and the predetermined temperature $T_{th}$ is set in advance by experimentation, etc. When the temperature of the front harnesses 81 is equal to or greater than $T_{th}$, the controller 7 executes the process of step S108. When the temperature of the front harnesses 81 is lower than $T_{th}$, the controller 7 executes the process of step S109.

In step S108, the controller 7 restricts the electric power outputted from the electric power generator 2. Specifically, on the basis of the temperature of the front harnesses 81, the upper limit value or the required torque of the rear drive motor 5 and the upper limit value of electric power outputted to the batteries 61, 62 (input electric power of the batteries 61, 62) are reduced. As previously described, the upper limit value of electric power outputted from the electric power generator 2 to the rear drive motor 5 is also reduced by reducing the upper limit value of the required torque of the rear drive motor 5. In addition, the controller 7 reduces the upper limit value of the required torque of the rear drive motor 5 and the upper limit value of electric power outputted to the batteries 61, 62 so that the degree of reduction in the upper limit value of electric power outputted to the batteries 61, 62 is greater than the degree of reduction in the upper limit value of electric power outputted to the rear drive motor 5. It is thereby possible to keep the reduction of driving electric power supplied to the rear drive motor 5 to a minimum while minimizing any temperature increase in the front harnesses 81.

In step S108, when only the electric power supplied from the electric power generator 2 to the rear drive motor 5 is passing through the front harnesses 81, the controller 7 reduces the upper limit value of electric power outputted by the electric power generator 2 on the basis of the temperature of the front harnesses 81. In this case, the electric power outputted by the batteries 61, 62 may be controlled so that the reduced amount of electric power is supplied from the batteries 61, 62 to the rear drive motor 5. In step S107, when only the electric power supplied from the batteries 61, 62 to the front drive motor 3 is passing through the front harnesses 81, the controller 7 reduces the upper limit value of electric power supplied from the batteries 61, 62 to the front drive motor 3 on the basis of the temperature of the front harnesses 81. However, as previously described, in these scenarios, normally the temperature of the front harnesses 81 will not be equal to or greater than the predetermined temperature $T_{th}$.

When the temperature of the front harnesses 81 is lower than $T_{th}$, or when the reduction of the upper limit value of the output electric power is carried out in step S108, the controller 7 assesses in step S109 whether or not the temperature of the rear harnesses 82 is equal to or greater than the predetermined temperature $T_{th}$. The predetermined temperature $T_{th}$ mentioned here is a temperature at which even if the rear harnesses 82 further rise in temperature, the critical value of the heatproof temperature of the rear harnesses 82 is not immediately reached, and the predetermined temperature $T_{th}$ is set in advance by experimentation, etc. When the temperature of the rear harnesses 82 is equal to or greater than $T_{th}$, the controller 7 executes the process of step S110. When the temperature of the rear harnesses 82 is lower than $T_{th}$, the controller 7 ends the control for harness protection, and after a predetermined time has elapsed, the controller 7 again executes the processes from step S101 onward.

In step S110, the controller 7 restricts the electric power supplied to the rear drive motor 5. Specifically, the upper limit value of the required torque of the rear drive motor 5 is reduced on the basis of the temperature of the rear harnesses 82. As a result, the upper limit value of electric power supplied to the rear drive motor 5 is reduced and any temperature increase in the rear harnesses 82 is minimized.

When at least one of the temperature of the front harnesses 81 and the temperature of the rear harnesses 82 is equal to or greater than $T_{th}$, the reduction of the upper limit value of the electric power outputted by the electric power generator 2 in step S108 and the reduction of the upper limit value of the electric power supplied to the rear drive motor 5 in step S110 may be executed. Specifically, the processes of step S107 and step S109 are performed simultaneously, and when at least one of the temperature of the front harnesses 81 and the temperature of the rear harnesses 82 is equal to or greater than the temperature $T_{th}$, the processes of step S108 and step S110 may be executed.

There may be different values used for a threshold value of the temperature of the front harnesses 81 and a threshold value of the temperature of the rear harnesses 82 at which the restriction of the electric power outputted by the electric power generator 2 and the restriction of the electric power supplied to the rear drive motor are initiated. Specifically, the predetermined temperature $T_{th}$ in step S107 and the predetermined temperature $T_{th}$ in step S109 may be set to different values. In this case, the threshold value of the temperature of the front harnesses 81 (the predetermined temperature $T_{th}$ in step S107) is preferably set to a value smaller than the threshold value of the temperature of the rear harnesses 82 (the predetermined temperature $T_{th}$ in step S109). It is thereby possible to further minimize any discomfort or dissatisfaction experienced by the driver, etc., while reliably minimizing any temperature increase in the front harnesses 81.

When the process of step S110 is executed, the controller 7 ends the control for harness protection, and after a predetermined time has elapsed, the controller 7 again executes the processes from step S101 onward.

The control for harness protection is stopped due to the controller 7 receiving a command to stop the device 100 for controlling a hybrid vehicle. For example, when a stop operation is performed in which the ignition key of the vehicle is switched to OFF, a stop command is sent to the controller 7. After the control for harness protection has been stopped, when a startup command is received and the control is again initiated, the estimated temperature T at the time of the previous estimation may use the ambient temperature $T\infty$, which is a fixed value, or may use the estimated temperature at the time of the stop. For example, the estimated temperature at the time of the stop may be used when the vehicle is again started up within a predetermined time following the stop.

Figure 4:
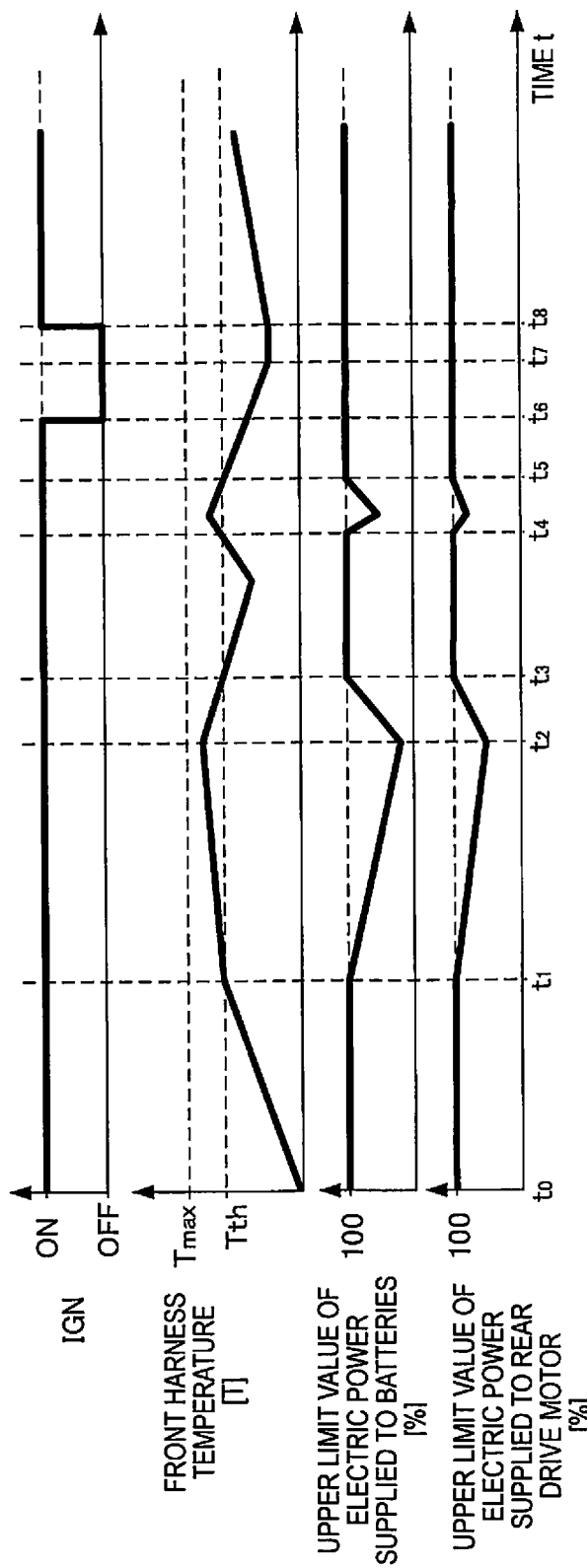
FIG. 4 is a timing chart illustrating the control for harness protection according to the first embodiment.

FIG. 4 is a timing chart illustrating the control for harness protection according to the first embodiment.

As shown in FIG. 4, at time t0, when an ignition switch (IGN) is switched to ON, the control for harness protection is initiated.

At time t1, when the temperature (estimated temperature) of the front harnesses 81 reaches the predetermined temperature $T_{th}$, restriction of the electric power outputted by the electric power generator 2 is initiated, and the upper limit value of electric power supplied to the batteries 61, 62 and the upper limit value of electric power supplied to the rear drive motor 5 are reduced. As the temperature of the front harnesses 81 rises, the electric power supplied to the batteries 61, 62 and the electric power supplied to the rear drive motor 5 are further reduced. At this time, a line indicating the upper limit value of electric power supplied to the batteries 61, 62 has a greater absolute value of slope than a line indicating the upper limit value of electric power supplied to the rear drive motor 5. Specifically, the degree of reduction in the upper limit value of electric power supplied to the batteries 61, 62 is greater than the degree of reduction in the upper limit value of electric power supplied to the rear drive motor 5.

At time t2, when the temperature of the front harnesses 81 stops rising and begins to decrease, the upper limit value of electric power supplied to the batteries 61, 62 and the electric power supplied to the rear drive motor 5 rise.

At time t3, when the temperature of the front harnesses 81 falls below the predetermined temperature $T_{th}$, the restriction of the electric power outputted by the electric power generator 2 ends, and the upper limit value of electric power supplied to the batteries 61, 62 and the upper limit value of electric power supplied to the rear drive motor 5 return to an unrestricted state (100%).

At time t4, when the temperature of the front harnesses 81 again reaches the predetermined temperature $T_{th}$, the restriction of the electric power outputted by the electric power generator 2 is initiated, and the upper limit value of electric power supplied to the batteries 61, 62 and the upper limit value of electric power supplied to the rear drive motor 5 are again reduced. When the temperature of the front harnesses 81 falls below the predetermined temperature $T_{th}$ at time t5 due to the output electric power restriction, the upper limit value of electric power supplied to the batteries 61, 62 and the upper limit value of electric power supplied to the rear drive motor 5 return again to an unrestricted state (100%).

At time t6, the ignition switch (IGN) is switched to OFF, and the controller 7 (VCM) stops at time t7. Even after the ignition switch (IGN) has been switched to OFF, the controller 7 (VCM) maintains the harness temperatures until the controller 7 stops (t6-t7).

At time t8, when the ignition switch (IGN) is switched to ON, the control for harness protection performed by the controller 7 is restarted and a harness temperature estimation is executed. At this time, when the interval from the stop time t7 to the restart time t8 of the controller 7 is short, the estimated temperature at the stop time t7 is used for the estimated temperature T at the time of the previous estimation.

According to the device 100 for controlling a hybrid vehicle of the first embodiment described above, the following effects can be achieved.

According to the device 100 for controlling a hybrid vehicle, when a temperature of front harnesses (harnesses) 81 is equal to or greater than a predetermined temperature, upper limit values of electric power supplied from an electric power generator (an electric power source) 2 to batteries (a vehicle electrical equipment) 61, 62 and a rear drive motor (a drive motor) 5 are reduced. A degree of reduction in the upper limit value for the batteries (a vehicle electrical equipment) 61, 62 is greater than a degree of reduction in the upper limit value for the rear drive motor (a drive motor) 5. Specifically, to minimize any temperature increase in the front harnesses (a harnesses) 81, the electric power supply from the electric power generator (an electric power source) 2 to the batteries (a vehicle electrical equipment) 61, 62 is restricted to an even greater extent, and a restriction of the electric power supply to the rear drive motor (a drive motor) 5 is further reduced. It is thereby possible to keep the reduction in driving electric power supplied to the rear drive motor (a drive motor 5) to a minimum while minimizing any temperature increase in the front harnesses (harnesses) 81. Accordingly, any discomfort or dissatisfaction experienced by the driver, etc., can be minimized while minimizing any temperature increase in the front harnesses (harnesses) 81.

In the present embodiment, estimations of the temperatures of the harnesses 81, 82 are performed on the basis of the values of electric currents flowing through the harnesses 81, 82, but this example is not provided by way of limitation as to the method of estimating the temperatures of the harnesses 81, 82; any known method may be used. If possible, the temperatures of the harnesses 81, 82 may be measured.

In the present embodiment, DC electric current values of inverters 21, 31, 51 are estimated, and the values of electric currents flowing through the harnesses 81, 82 are estimated on the basis of these estimated values and input/output electric current values of the batteries 61, 62, but this example is not provided by way of limitation. Specifically, the values of electric currents flowing through the harnesses 81, 82 may be estimated using any known method. If possible, the electric current values of the harnesses 81, 82 may be measured.

In the present embodiment, as the temperature of the front harnesses 81 rises, the upper limit value of electric power supplied from the electric power generator 2 to the rear drive motor 5 and the upper limit value of electric power supplied to the batteries 61, 62 are reduced in linear fashion, but this example is not provided by way of limitation. For example, a plurality of threshold values may be provided for the temperature of the front harnesses 81 and the upper limit values may be reduced in stepwise fashion when the threshold values are reached.

Second Embodiment

A hybrid vehicle device 100 for controlling a hybrid vehicle according to a second embodiment shall be described with reference to FIG. 5. The present embodiment differs from the first embodiment in that when the electric power supplied from the electric power generator (electric power source) 2 to the rear drive motor 5 falls below the required electric power of the rear drive motor 5, the electric power supplied from the electric power generator (electric power source) 2 to the front drive motor 3 is increased. The same elements as those in the first embodiment are designated by the same reference numerals, and the descriptions thereof are omitted.

Figure 5:
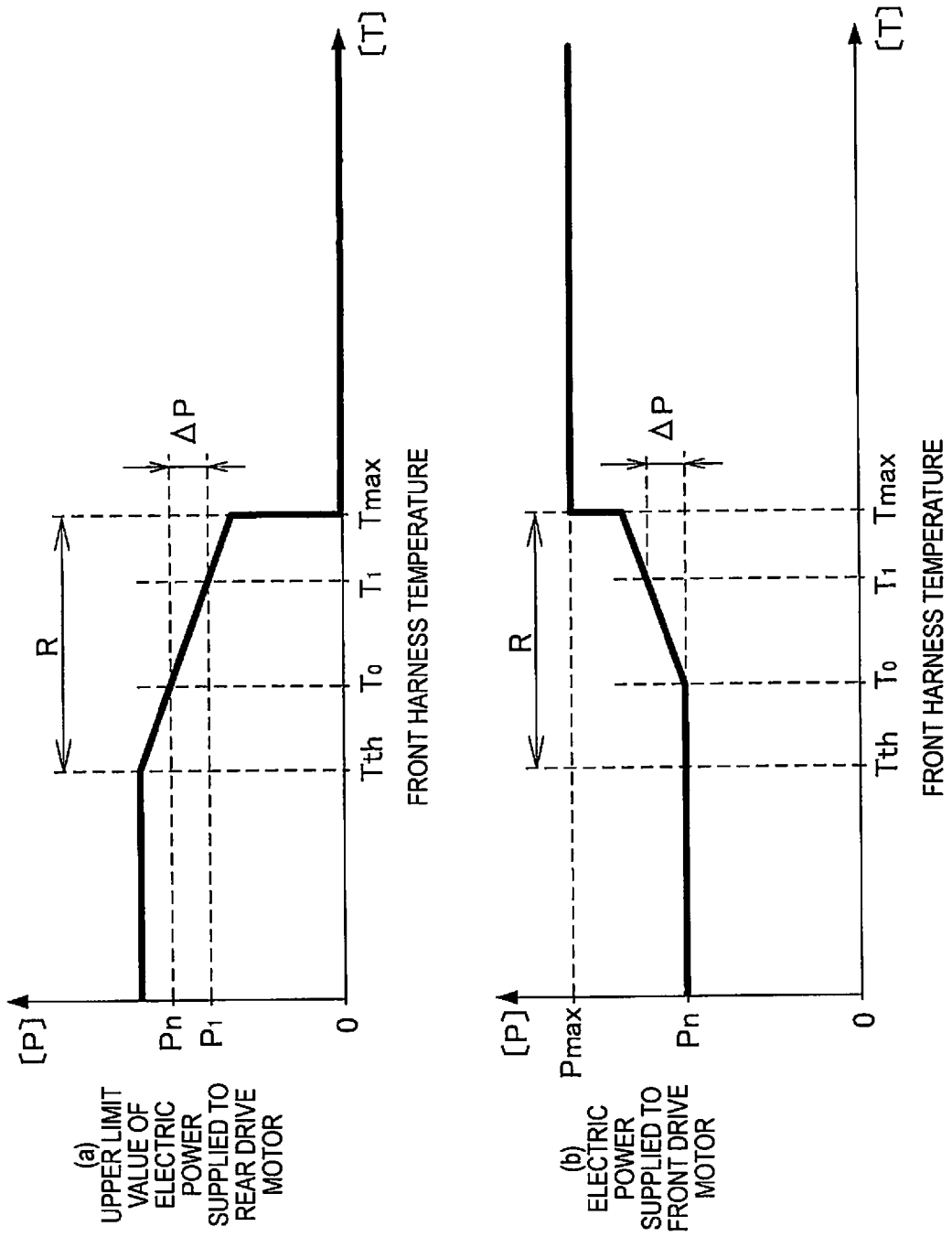
FIG. 5 shows graphs illustrating the control for harness protection according to a second embodiment.

FIG. 5 shows graphs illustrating the control for harness protection according to the second embodiment, and these graphs show relationships of the temperature of the front harnesses 81 to the upper limit value of electric power supplied to the rear drive motor 5 and to the required electric power of the front drive motor 3. The graphs of FIG. 5 illustrate control executed in a scenario in which charging of the batteries 61, 62 and electric power supply to the rear drive motor 5 are done simultaneously.

Graph (a) of FIG. 5 shows a relationship between the temperature of the front harnesses 81 and the upper limit value of electric power outputted to the rear drive motor 5, and graph (b) of FIG. 5 shows a relationship between the temperature of the front harnesses 81 and the required electric power of the front drive motor 3.

As shown in FIG. 5, when the temperature of the front harnesses 81 is equal to or greater than the predetermined temperature $T_{th}$, the upper limit value of electric power outputted from the electric power generator 2 to the rear drive motor 5 is reduced. In addition, though not shown, the upper limit value of electric power supplied from the electric power generator 2 to the batteries 61, 62 is also reduced. When the temperature of the front harnesses 81 exceeds the critical temperature $T_{max}$, the relays 63 are switched to the OFF state, and the electric power supply from the electric power generator 2 to the rear drive motor 5 and the batteries 61, 62 is cut off. As in the first embodiment, when the temperature of the front harnesses 81 is in a range (restriction range R) from the predetermined temperature $T_{th}$ to the critical temperature $T_{max}$ (inclusive), the degree of reduction in the upper limit value of electric power supplied to the batteries 61, 62 is greater than the degree of reduction in the upper limit value of electric power supplied to the rear drive motor 5.

In this embodiment, it is assumed that electric power P needed to satisfy the required torque Tr1 of the rear drive motor 5 (the required electric power of the rear drive motor 5) is Pn. In this case, when, for example, the temperature of the front harnesses 81 rises to $T_1$, the upper limit value of electric power supplied to the rear drive motor 5 decreases to $P_1$, whereby the electric power that can be supplied becomes insufficient by the equivalent of ΔP for the required electric power of the rear drive motor 5. The driving force of the rear drive motor 5 thereby decreases, and there is a risk that the driver, etc., will experience discomfort.

In view of this, in the present embodiment, the electric power supplied to the rear drive motor 5 decreases due to the upper limit value of electric power supplied to the rear drive motor 5 being reduced, and when the required torque of the rear drive motor 5 cannot be satisfied, the required torque of the front drive motor 3 is increased by the difference between the required torque of the rear drive motor 5 and the actual torque. Due to these actions, the driving force of the entire vehicle can be maintained, and any discomfort for the driver, etc., is minimized.

In FIG. 5, when the temperature of the front harnesses 81 rises, the upper limit value of electric power supplied from the electric power generator 2 is reduced, and when the temperature of the front harnesses 81 exceeds $T_0$, the upper limit value of electric power supplied to the rear drive motor 5 falls below the required electric power Pn of the rear drive motor 5. Accordingly, it becomes impossible to supply the rear drive motor 5 with electric power sufficient to satisfy the required torque of the rear drive motor 5.

When the temperature of the front harnesses 81 exceeds $T_0$, the required torque of the front drive motor 3 is increased by the difference between the required torque of the rear drive motor 5 and the actual torque. As a result, the required electric power of the front drive motor 3 rises by the difference between the required electric power of the rear drive motor 5 and the electric power supplied to the rear drive motor 5 (the upper limit value of electric power supplied to the rear drive motor 5), and the electric power supplied from the electric power generator 2 to the front drive motor 3 is increased.

For example, at a temperature $T_1$ of the front harnesses 81, the electric power supplied from the electric power generator 2 to the front drive motor 3 is increased by the difference ΔP between the required electric power Pn of the rear drive motor 5 and the upper limit value $P_1$ of electric power supplied to the rear drive motor 5. Specifically, the electric power needed for the increased required torque of the front drive motor 3 is supplied from the electric power generator 2 to the front drive motor 3.

Thus, even if the torque of the front drive motor 3 is raised and the electric power supplied to the front drive motor 3 is increased, the problem of exceeding the heatproof temperature does not occur because the electric power generator 2 and the front drive motor 3 are connected via the busbars 83 without being routed through harnesses.

When the temperature of the front harnesses 81 exceeds the critical temperature $T_{max}$ and the electric power supplied to the rear drive motor is zero, the required torque of the front drive motor 3 rises to an upper limit and electric power $P_{max}$ satisfying the torque upper limit value is supplied to the front drive motor 3.

According to the device 100 for controlling a hybrid vehicle of the second embodiment described above, the following effects can be achieved.

According to the device 100 for controlling a hybrid vehicle, the front drive motor 3 is electrically connected to the electric power generator (an electric power source) 2 without being routed through the front harnesses (harnesses) 81. When the temperature of the front harnesses (harnesses) 81 is equal to or greater than a predetermined temperature, upper limit values of electric power supplied from the electric power generator (an electric power source) 2 to the vehicle electrical equipment (batteries 61, 62) and to the rear drive motor 5 are both reduced. When the electric power supplied to the rear drive motor 5 falls below the required electric power of the rear drive motor 5 due to the upper limit values being reduced, the electric power supplied from the electric power generator (an electric power source) 2 to the front drive motor 3 is increased by the difference between the required electric power of the rear drive motor 5 and the electric power supplied to the rear drive motor 5. Thus, the electric power supplied to the front drive motor 3 is increased and the shortage of electric power supplied to the rear drive motor 5 is compensated for. Accordingly, the electric power supplied overall to the drive motors 3, 5 does not decrease; therefore, required torque can be satisfied and driving force can be maintained for the entire vehicle. In addition, electric power supplied to the front drive motor 3 is increased, the front drive motor 3 being able to supply electric power without supplying through the front harnesses (harnesses) 81; therefore, electric power passing through the front harnesses (harnesses) 81 is not increased, and electric power satisfying the torque required for the entire vehicle can be supplied to the drive motors 3, 5. Specifically, the upper limit value of electric power supplied to the rear drive motor 5 can be reduced to maintain the driving force for the entire vehicle while restricting the electric power passing through the front harnesses (harnesses) 81. Accordingly, any discomfort or dissatisfaction experienced by the driver, etc., can be further minimized while minimizing the temperature of the front harnesses (harnesses) 81.

In both of the embodiments, the electric power source that supplies electric power to the batteries 61, 62 was the electric power generator 2, but the electric power generator 2 is not provided by way of limitation on the electric power source, which may, for example, be a fuel cell, etc.

In both of the embodiments, the vehicle electrical equipment to which electric power is supplied from the electric power generator (an electric power source) 2 was the high-power batteries 61, 62, but the high-power batteries 61, 62 are not provided by way of limitation as to the destination of electric power supplied from the electric power generator (an electric power source) 2. For example, electric power may be supplied from the electric power generator (an electric power source) 2 via the front harnesses (harnesses) 81 to auxiliary equipment actuated by high electric power, or electric power may be supplied to non-high-power auxiliary equipment. In these cases, as in the embodiments described above, when the temperature of the front harnesses (harnesses) 81 is equal to or greater than a predetermined temperature, the upper limit values of electric power supplied to the auxiliary equipment and the rear drive motor (a drive motor) 5 are reduced. In addition, as in the embodiments described above, the degree of reduction in the upper limit value for the auxiliary equipment is increased above the degree of reduction in the upper limit value for the rear drive motor (a drive motor) 5.

Embodiments of the present invention were described above, but the above embodiments merely depict some applied examples of the present invention, and the technical scope of the present invention is not intended to be limited to the specific configurations of the above embodiments.

The embodiments described above were described as independent embodiments, but may be combined as appropriate.

The invention claimed is:

1. A hybrid vehicle control method for controlling a hybrid vehicle comprising an electric power source, a vehicle electrical equipment and a drive motor to which electric power is supplied from the electric power source, wherein the vehicle electrical equipment and the drive motor are electrically connected to the electric power source via at least a shared harness, the hybrid vehicle control method comprising:

reducing both upper limit values of the electric power supplied from the electric power source to the vehicle electrical equipment and the drive motor when a temperature of the harness is equal to or greater than a predetermined temperature; and controlling a degree of reduction in the upper limit value for the vehicle equipment to be greater than a degree of reduction in the upper limit value for the drive motor.

2. The hybrid vehicle control method according to claim 1, wherein the drive motor is a rear drive motor, the hybrid vehicle further comprises a front drive motor to which electric power is supplied from the electric power source, the front drive motor is electrically connected to the electric power source without being routed through the shared harness, and further comprising increasing the electric power supplied from the electric power source to the front drive motor by a difference between a required electric power of the rear drive motor and the electric power supplied to the rear drive motor when the electric power supplied to the rear drive motor from the electric power source falls below the required electric power of the rear drive motor due to the upper limit value of electric power supplied to the rear drive motor being reduced.

3. The hybrid vehicle control method according to claim 1, wherein the drive motor is a rear drive motor, the electric power source is an electric power generator driven by an engine installed in the vehicle, the vehicle electrical equipment is a battery charged by the electric power generator, and the battery is connected to the rear drive motor so as to be capable of supplying electric power thereto.

4. A hybrid vehicle control device for controlling a hybrid vehicle including an electric power source, a vehicle electrical equipment to which electric power is supplied from the electric power source, and a drive motor to which electric power is supplied from the electric power source, the vehicle electrical equipment and the drive motor being electrically connected to the electric power source via a shared harness, the hybrid vehicle control device comprising:

a controller that controls electric power supplied to the drive motor, the controller being configured to reduce upper limit values of the electric power supplied from the electric power source to the vehicle electrical equipment and to the drive motor when a temperature of the harness is equal to or greater than a predetermined temperature, and the controller being configured to control a degree of reduction in the upper limit value for the vehicle electrical equipment is greater than a degree of reduction in the upper limit value for the drive motor.

\* \* \* \* \*